United States Patent
Sutorius

(10) Patent No.: US 12,412,477 B2
(45) Date of Patent: *Sep. 9, 2025

(54) SYSTEM AND METHOD OF DETECTING VACANT PARKING SPOTS

(71) Applicant: Aptiv Technologies AG, Schaffhausen (CH)

(72) Inventor: Mason B. Sutorius, Carmel, IN (US)

(73) Assignee: Aptiv Technologies AG, Schaffhausen (CH)

( * ) Notice: Subject to any disclaimer, the term of this patent is extended or adjusted under 35 U.S.C. 154(b) by 300 days.

This patent is subject to a terminal disclaimer.

(21) Appl. No.: 17/739,905

(22) Filed: May 9, 2022

(65) Prior Publication Data

US 2022/0262255 A1    Aug. 18, 2022

Related U.S. Application Data

(63) Continuation of application No. 16/824,882, filed on Mar. 20, 2020, now Pat. No. 11,328,607.

(51) Int. Cl.
*G08G 1/16* (2006.01)
*B60R 11/04* (2006.01)
*G06V 20/58* (2022.01)
*G08G 1/14* (2006.01)

(52) U.S. Cl.
CPC .............. *G08G 1/168* (2013.01); *B60R 11/04* (2013.01); *G06V 20/586* (2022.01); *G08G 1/143* (2013.01); *G08G 1/146* (2013.01); *B60R 2300/103* (2013.01); *B60R 2300/8053* (2013.01); *B60R 2300/806* (2013.01)

(58) Field of Classification Search
CPC .............................. B60W 30/06; G08G 1/143
USPC ........................................................ 340/932.2
See application file for complete search history.

(56) References Cited

U.S. PATENT DOCUMENTS

| | | | |
|---|---|---|---|
| 4,931,930 A | 6/1990 | Shyu et al. | |
| 8,319,663 B2 | 11/2012 | Von Reyher et al. | |
| 2006/0184297 A1* | 8/2006 | Higgins-Luthman | G06V 20/58 701/41 |
| 2006/0220911 A1* | 10/2006 | Jaupitre | G08G 1/14 340/932.2 |

(Continued)

FOREIGN PATENT DOCUMENTS

| | | |
|---|---|---|
| CN | 101414411 A | 4/2009 |
| CN | 109918977 A | 6/2019 |

(Continued)

OTHER PUBLICATIONS

Applied Science 2019, 9, 3403, Published: Aug. 19, 2019: Around View Monitoring-Based Vacant Parking Space 2 Detection and Analysis, Hsu et al.

(Continued)

*Primary Examiner* — Fabricio R Murillo Garcia
(74) *Attorney, Agent, or Firm* — Billion & Armitage

(57) ABSTRACT

A method of identifying vacant parking locations includes receiving sensor data captured with respect to a parking aisle and analyzing the received sensor data to detect shadows cast by parked vehicles within the parking aisle. Vacant parking spots are detected based on the detected shadows. An output is generated indicating whether a parking spot vacancy has been detected within the parking aisle.

20 Claims, 7 Drawing Sheets

(56) References Cited

U.S. PATENT DOCUMENTS

| | | | |
|---|---|---|---|
| 2009/0189781 A1 | 7/2009 | Taylor et al. | |
| 2016/0019428 A1* | 1/2016 | Renner | G06T 7/0004 |
| | | | 382/195 |
| 2016/0343139 A1 | 11/2016 | Diegmann et al. | |
| 2018/0201256 A1* | 7/2018 | Tseng | G05D 1/0055 |
| 2019/0272753 A1 | 9/2019 | Homutescu | |
| 2019/0339706 A1 | 11/2019 | Batur | |
| 2019/0382001 A1* | 12/2019 | Chelian | G08G 1/147 |
| 2020/0042801 A1 | 2/2020 | Auner | |
| 2020/0143683 A1* | 5/2020 | Maruiwa | G08G 1/149 |
| 2020/0151912 A1* | 5/2020 | Torikura | G06T 7/97 |
| 2021/0049383 A1* | 2/2021 | LaVelle | G01S 13/825 |

FOREIGN PATENT DOCUMENTS

| | | |
|---|---|---|
| DE | 102017007210 A1 | 3/2018 |
| EP | 2626666 B1 | 3/2017 |
| JP | 2010117800 A | 5/2010 |
| JP | 2013182562 A | 9/2013 |

OTHER PUBLICATIONS

English Translation Abstract for EP 262666681, published Mar. 15, 2017.

Pattern Recognition, vol. 45, No. 4, pp. 16841695, 2012, Shadow Detection: A Survey and Comparative Evaluation of Recent Methods, Sanin et al.

The Thirty-First AAAI Conference on Innovative Applications of Artificial Intelligence (IMI-19), 2019, Early Detection of 3 Vacant Parking Spaces Using Dashcam Videos, Wu et al.

"Extended European Search Report Received mailed Aug. 18, 2021", 9 pages.

"Second Office Action Received mailed on May 19, 2023", 16 Pages.

"Non-Final Office Action Mailed on Oct, 20, 2022", 8 Pages.

"Notice of Decision to Grant Mailed on Sep. 27, 2023", 4 pages.

* cited by examiner

SYSTEM AND METHOD OF DETECTING VACANT PARKING SPOTS

CROSS-REFERENCE TO RELATED APPLICATIONS

This application is a continuation application and claims the benefit of U.S. patent application Ser. No. 16/824,882, filed Mar. 20, 2020, the entire disclosure of each of which is hereby incorporated by reference.

FIELD

This disclosure is directed generally to semi-autonomous and autonomous vehicles and, in particular, to the detection of vacant parking spots based on sensor input.

BACKGROUND

Autonomous or semi-autonomous vehicles rely on a host of sensors capable of detecting and interpreting the environment surrounding the vehicle. These systems may be utilized to provide driver assist functions, such as parking assist, autonomous parking, and autonomous valet parking. For example, having entered a parking facility the vehicle may enter a valet parking mode in which the passengers exit the vehicle and the vehicle proceeds to locate a parking spot. The process of locating a vacant parking spot requires an unoccluded view of the parking spot, which is complicated by the presence of other parked vehicles. Typically, this requires the vehicle to travel down the parking aisle to a position adjacent to a vacant spot to allow on-board sensors to detect the vacant spot. Logistically, this is problematic as it may require the vehicle to traverse a number of parking aisles in order to find a vacant spot. It would be beneficial to develop a system and method that allows the vehicle to detect vacant parking spots without requiring the vehicle to be adjacent to the detected parking spot (i.e., to allow the vehicle to determine from a position adjacent to the aisle whether the aisle is likely to include vacant parking spots).

SUMMARY

According to some aspects, a method of identifying vacant parking locations may include receiving sensor data captured with respect to a parking aisle and analyzing the received sensor data to detect shadows cast by parked vehicles within the parking aisle. The method may further include detecting a vacant parking spot based on the detected shadows and generating an output indicating whether a parking spot vacancy has been detected within the parking aisle.

According to another aspect, a method of self-parking a vehicle within a parking lot may include positioning the vehicle at a first end of a first aisle and detecting shadows in the aisle using input received from one or more first sensors. The method may further include detecting parked vehicles based on the detected shadows, wherein if all parking spots are occupied the vehicle is instructed to proceed directly to the next aisle.

According to another aspect, a parking vacancy detection system for use in vehicles may include a first plurality of sensors configured to detect image data associated with a parking aisle located adjacent to the vehicle and a processor/controller configured to receive the image data detected by the first plurality of sensors. In some embodiments, the processor/controller is configured to detect shadows based on the received image data and to detect vacant parking spots based on detected gaps within the detected shadows, wherein the processor/controller generates an output identifying whether the parking aisle includes vacant parking spots.

DETAILED DESCRIPTION

According to some embodiments, a method of detecting vacant parking location within a parking lot includes receiving sensor data captured with respect to the parking lot (e.g., parking aisle). The sensor data—such as camera and/or infrared images—are utilized to detect the presence of shadows cast by the parked vehicles. For example, a variety of methods (e.g., color-based, texture-based, intensity-based, etc.) may be utilized to detect the presence of shadows within an image. Likewise, infrared images may be utilized to detect shadows based on differences in temperature resulting from the presence of shadows. Vacant parking spots are detected based on analysis of the detected shadows—in particular analysis of the gaps between adjacent shadows. If a vacant parking spot is detected, the vehicle may proceed down the aisle to the detected vacancy. If no vacant parking spot is detected, then the vehicle may proceed to the next aisle and repeat the process. A benefit of the system and method described herein is that the vehicle may be able to detect parking spot vacancies without being required to proceed down each aisle to a location adjacent to the vacancy.

Figure 1A:
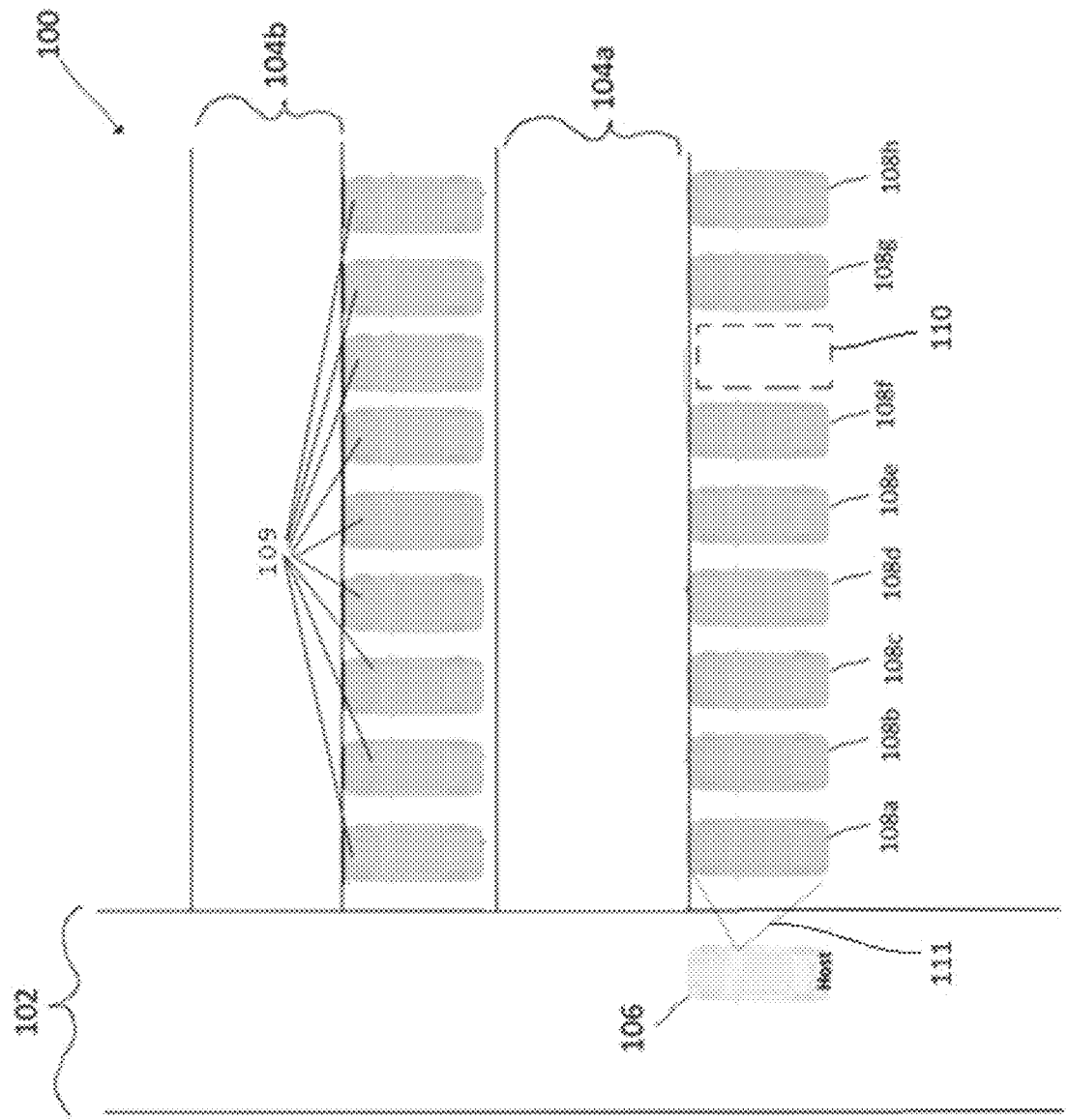
FIGS. 1a and 1b are top views of a parking lot that illustrate a search for a vacant parking spot according to some embodiments.
Figure 1B:
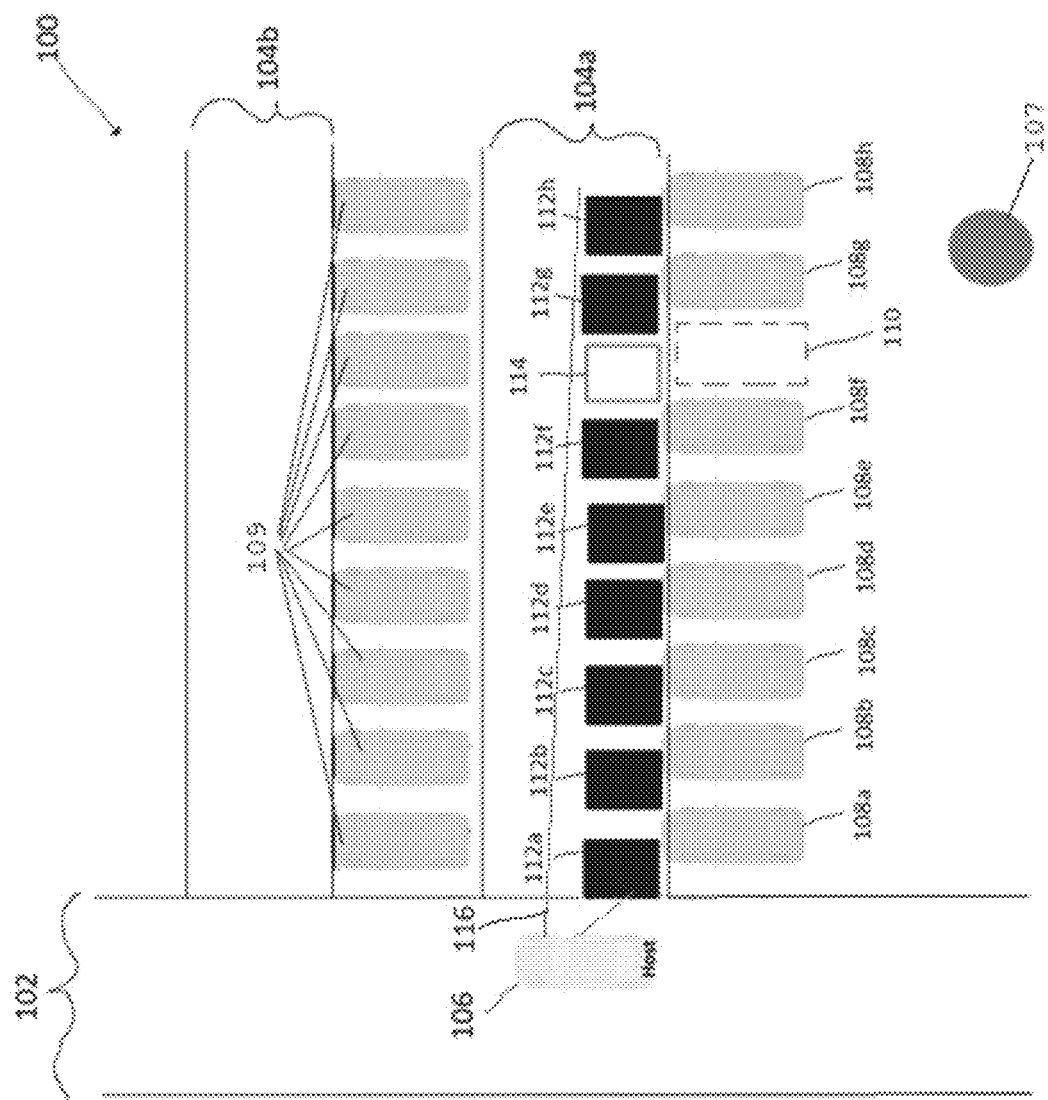

Referring to FIGS. 1a and 1b, a top view of a parking lot 100 is shown, wherein the parking lot includes a first aisle 104a and a second aisle 104b. With respect to the first aisle 104a, a first plurality of vehicles 108a-108h (collectively, vehicles 108) are parked adjacent the aisle. With respect to the second aisle, a second plurality of vehicles 109 are parked in the aisle. For purposes of this discussion, it is assumed that the parking spots occupied by the first plurality of vehicles 108 may be accessed only through the first aisle 104a and the parking spots occupied by the second plurality of vehicles 109 may be accessed only through the second aisle 104b. In other parking lots, parking spots occupied by the second plurality of vehicles 109 may be accessed via the first aisle 104a. As described later, information regarding the layout and rules of the parking lot may be utilized by the systems and methods described herein.

In the example shown in FIG. 1a, a parking spot vacancy 110 is located between parked vehicles 108f and 108g. However, relative to the vehicle 106, this vacancy is occluded by the presence of the plurality of vehicles 108a-108f. In some embodiments, although the parking spot 110 is occluded from view, shadows 112a-112h (see FIG. 1b) cast by the plurality of parked vehicles 108a-108h, respectively, may be detected along with the lack of shadow—shadow vacancy 114—and utilized to detect parking vacancy 110. In the embodiment shown in FIGS. 1a and 1b, shadows are cast by the sun 107, but in other embodiments may be cast by other sources of light. A benefit of this approach is that the detection of parking vacancy 110 may be made from the end of the aisle 104a as shown in FIG. 1b. That is, the vehicle 106 is not required to traverse the aisle 104a to a position adjacent to the parking vacancy 110 in order to detect the vacancy. In the event a determination is made that the aisle does not include any parking vacancies (i.e., confirms that each of the parking spots are occupied), the vehicle 106 proceeds to the next aisle (e.g., aisle 104b) and performs the same search. In some embodiments, if a determination cannot be made that each of the parking spots are occupied—for example, due to time of day, cloud cover, etc.—then in some embodiments the vehicle may default to continuing down the aisle and checking for vacancies using other sensors.

In some embodiments, vehicle 106 includes one or more first sensors (not shown) utilized to detect the presence of objects (e.g., vehicles) and one or more second sensors utilized to detect the presence of or effects of shadows. For example, in some embodiments the one or more first sensors utilized to detect the presence of adjacent vehicles includes one or more of LiDAR sensors, radar sensors, and/or cameras. In some embodiments, the one or more second sensors utilized to detect the presence of or effects of shadows includes one or more of cameras and infrared sensors. In some embodiments, the same sensor utilized to detect the presence of vehicles may also be utilized to detect the presence or lack thereof of shadows. For example, a camera-based sensor may be utilized to both detect the presence of vehicles and detect the presence of shadows.

Figure 2:
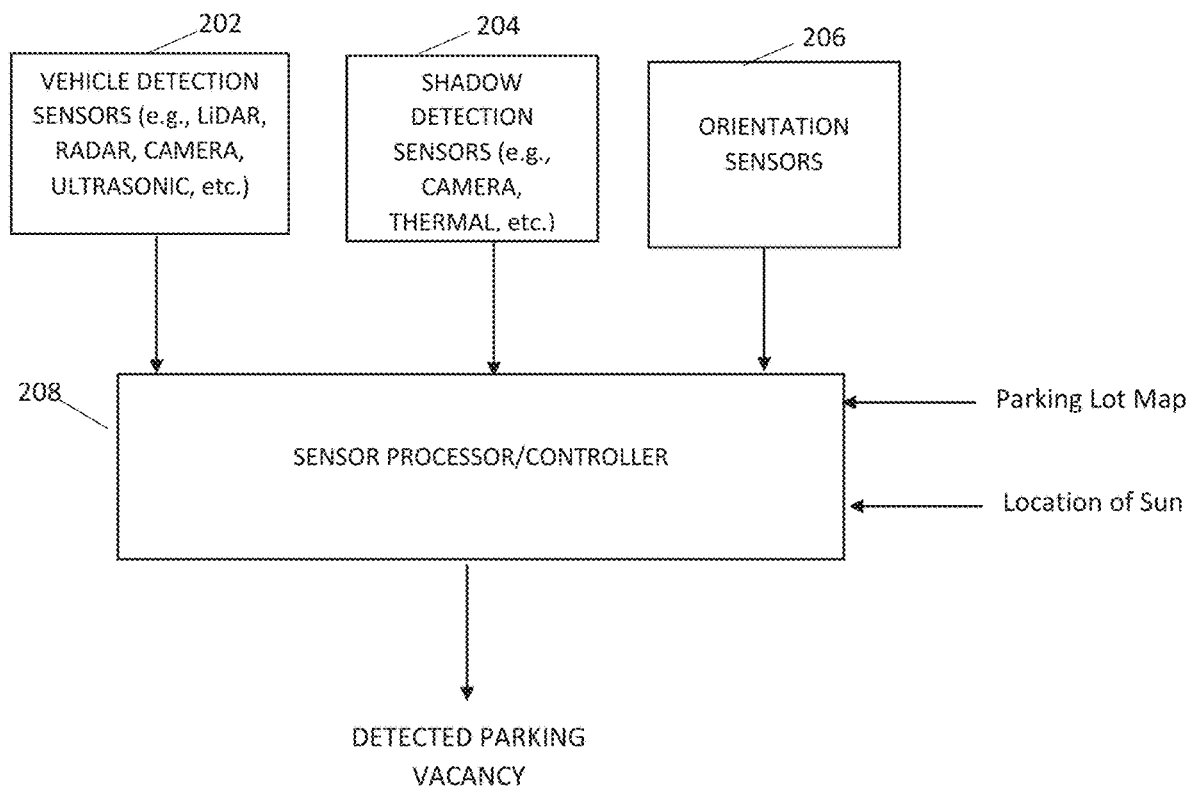
FIG. 2 is a flowchart illustrating a method of detecting vacant parking spots according to some embodiments.
Figure 3:
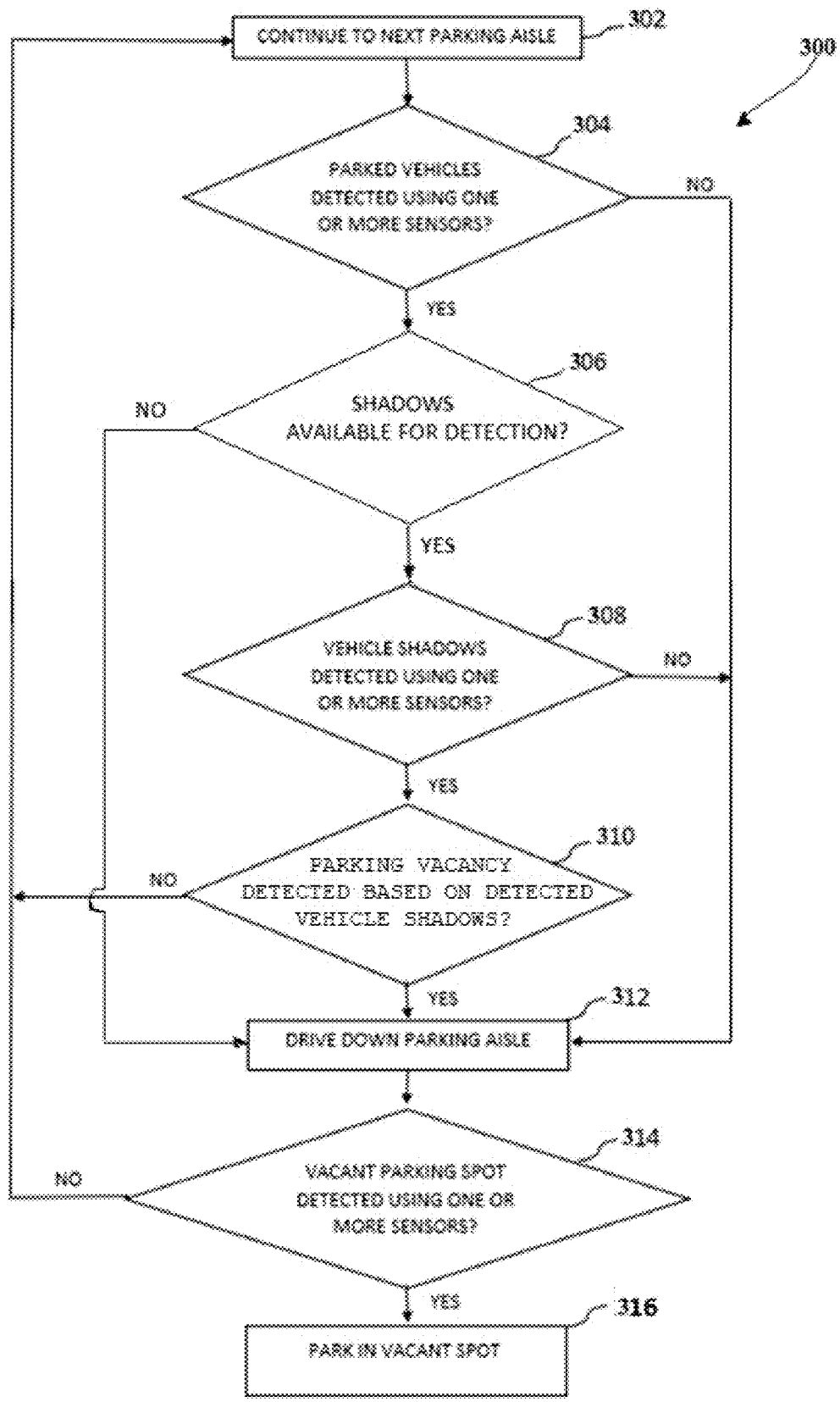
FIG. 3 is a block diagram illustrating an autonomous parking system according to some embodiments.

Referring to FIGS. 2 and 3, a system and method of detecting vacant parking spots is provided. In particular, FIG. 2 is a block diagram illustrating a parking vacancy detection system that utilizes shadow detection to detect vacant parking spots according to some embodiments. FIG. 3 is a flowchart illustrating steps implemented to detect vacant parking spots based on detected shadows.

According to some embodiments, the parking vacancy detection system 200 is deployed on a vehicle being parked autonomously or semi-autonomously and includes one or more sensors, including one or more of vehicle detection sensors 202, shadow detection sensors 204, and orientation sensors 206, and a processor/controller 208. In some embodiments, the vehicle detection sensor includes one or more of LiDAR sensors, radar sensors, cameras, and/or other sensors capable of detecting the presence of objects/vehicles within the vicinity of the vehicle being parked. In some embodiments, the shadow detection sensors 204 include one or more cameras and/or infrared sensors capable of detecting the presence of shadows. In some embodiments, an orientation sensor 206 provides input to the parking vacancy detection system 200 regarding the orientation of the vehicle to be parked, wherein the orientation sensor 206 includes one or more of an inertial measurement unit (IMU), accelerometers, etc. In some embodiments, some of the sensors utilized for vehicle detection are also utilized for shadow detection. For example, cameras may be utilized for both vehicle detection and shadow detection.

In some embodiments, processor/controller 208 receives inputs from one or more of the sensors and utilizes the received inputs to detect parking vacancies. In some embodiments, processor controller 208 may additionally receive inputs from other sources, such as map information provided with respect to a parking facility and/or inputs regarding the weather and/or location of the sun. As described in more detail below, in some embodiments these inputs are utilized to make determinations regarding whether shadows are present and if so, the likely direction in which shadows will be cast. For example, information regarding the location of artificial lights within indoor and outdoor (at least at night) parking facilities may be utilized to determine the likely location of shadows cast by parked vehicles. Likewise, the location/orientation of the sun may similarly be utilized to determine the likely location of shadows cast by parked vehicles.

In some embodiments, processor/controller 208 utilizes the received inputs to detect parking vacancies and to provide an output utilized by the semi-autonomous or autonomous vehicle to assist in self-park operations. For example, detection of a parking vacancy may result in the semi-autonomous or autonomous vehicle proceeding down the aisle to the parking vacancy detected. Alternatively, a determination that the aisle does not include any parking vacancies may result in the semi-autonomous or autonomous vehicle proceeding to the next aisle, wherein the process is repeated. In some embodiments, the determination that an aisle does not include any parking vacancies is not simply a determination that no vacancies were detected, but rather a determination than all parking spots are occupied. In the case that it can be determined that all spots are in fact occupied, then the autonomous vehicle may proceed to the next aisle, saving the cost associated with travel down the occupied aisle.

For example, the flowchart provided with respect to FIG. 3 illustrates steps performed as part of the semi-autonomous or autonomous vehicles according to some embodiments. At step 302, the vehicle proceeds to an aisle. In the example shown in FIG. 1b, vehicle 106 proceeds first to aisle 104a. More particularly, the vehicle proceeds to a first position located at the start or head of the aisle, with sensors oriented in the direction of vehicles parked along the adjacent aisle.

At step 304, one or more first sensors are utilized to detect the presence of parked vehicles in the aisle. For example, in the embodiment shown in FIG. 1a, processor/controller 208 utilizes inputs received from one or more vehicle detection sensors 202 to determine whether aisle 104a includes the presence of parked vehicles 108a-108h. In the event that the parking aisle 104a does not include any parked vehicles, then the method proceeds to step 312 in which the vehicle proceeds down the aisle and parks. In this instance, no analysis of shadows is required—and in fact because no vehicles are parked in the aisle no shadows will be cast. That is, no determination can be made that all parking spots are occupied. In the example shown in FIG. 1a, a sensor generates a LiDAR signal 111 that reflects off of adjacent vehicle 108a and is utilized to detect the presence of at least one vehicle in parking aisle 104a.

At step 306, a determination is made whether shadows may be utilized to detect the presence of vacant parking spots. In some embodiments, this determination may be made based on one or more of a plurality of factors. For example, in some embodiments the time of day may be utilized to determine whether it is likely that shadows will be generated (e.g., if at night, shadows will not be cast by the sun). In some embodiments, the weather (e.g., cloudy, sunny) may be utilized to determine the likelihood of shadows being cast. In some embodiments, shadows cast by artificial light may be utilized in the event information is available regarding the presence of artificial light sources and assuming a time of day that would utilize artificial light sources.

In other embodiments, the determination of whether shadows are being cast may further include whether shadows are being cast in a way that is useful for detecting vacancies. This may include utilizing information regarding the location of a light source (e.g., sun, artificial sources, etc.) relative to a parking aisle and the resulting direction in which shadows will be cast. This may also require information regarding the orientation of the vehicle as provided by orientation sensor 206 shown in FIG. 2.

If at step 306 a determination is made that shadows cannot be utilized to detect the presence of vacant parking spots, then the vehicle is instructed to traverse down the aisle at step 312 and to utilize one or more sensors to detect the presence of a vacant parking spot. If at step 306 a determination is made that shadows can be utilized to detect the presence of vacant parking spots, then the method proceeds to step 308.

Figure 5A:
FIG. 5a is a photograph of a parking aisle captured by one or more sensors on the vehicle being parked prior to proceeding down an aisle.
Figure 5B:
FIG. 5b is a magnified view of the parking aisle.

At step 308, the one or more sensors are utilized to detect the presence of shadows. A number of methods may be utilized to detect the presence of shadows. For example, in some embodiments the input is an image such as those shown in FIGS. 5*a* and 5*b*, wherein FIG. 5*b* illustrates a magnified view of the image shown in FIG. 5*a*. The presence of shadows is detected using one or more computer-vision techniques, such as color-based, texture-based, geometric-based, and/or intensity-based techniques. For example, intensity-based techniques compare the intensity of adjacent pixels, wherein pixels associated with shadows will illustrate a reduction in intensity. This is evident with respect to FIG. 5*b*, in which pixels located in shadows display an intensity significantly less than adjacent pixels receiving direct sunlight. In some embodiments, either alone or in combination with intensity-based techniques, color-based techniques may be utilized, wherein color-based techniques rely on spectral features of the pixels to detect the presence of shadows. For example, in some embodiments shifts in the frequency of light (e.g., color) are utilized to detect shadows, wherein a shift towards the blue spectrum indicates a possible shadow as a result of white light from the sun being blocked without blocking blue light reflected from the sky. In some embodiments, a combination of intensity and color-based techniques are utilized, wherein pixels located within shadows can be expected to display lower intensity without a corresponding change in color. The combination of both features may be utilized to detect shadow pixels. In still other embodiments, knowledge of the location of illumination sources (e.g., both natural and artificial) and the likely geometry of objects (e.g., vehicles) casting shadows is utilized to determine the expected geometry of shadows being cast. In still other embodiments, texture-based methods are utilized, wherein during a first stage pixels are identified as being potential shadow pixels (using any number of techniques) and in a second stage the texture of shadow pixels are compared to the texture of a background reference image, wherein if the texture is similar the pixels are identified as shadow pixels. In still other embodiments, other computer vision techniques may be utilized to detect the presence of shadows.

In other embodiments, other types of sensor inputs may be utilized, such as infrared inputs. Infrared sensors detect temperature and may be utilized in outdoor parking lots during the day in which the presence of shadows will result in a temperature differential capable of detection. In still other embodiments, other indications of the presence and/or absence of vehicles may be utilized. For example, the presence of dry pavement (adjacent to vehicles) and wet pavement (resulting from a lack of shielding from a vehicle) may be utilized to detect vacant parking spots.

At step 308, if no shadows are detected using one or more sensors—but from step 304 we know that vehicles are parked in the aisle—then shadows will not be available to detect the presence of vacancies and the vehicle will be required to drive down the parking aisle at step 312. If at step 308 one or more shadows are detected, then a determination is made that shadows can be utilized to detect the presence or absence of parking vacancies and the method proceeds to step 310.

At step 310 the vehicle shadows detected at step 308 are utilized to detect parking vacancies. In particular, gaps or spaces in the detected shadows of the appropriate size, shape, etc. are utilized to detect a parking vacancy (or conversely the lack of gaps or spaces are utilized to determine that all parking spots are occupied). For example, referring to the example shown in FIG. 1*b*, a plurality of shadows 112*a*-112*f* and 112*g*-112*h* are detected, each shadow indicating the presence of a parked vehicle. Analysis of the detected shadows (i.e., array of shadows) indicates an absence of a shadow corresponding with location 114. This gap in the array of detected shadows, specifically the gap detected between shadows 112*f* and 112*g* indicates the presence of a parking spot vacancy at location 110. In this way, the determination at step 310 may be viewed as a detection of missing shadows indicative of a vacant parking spot, or detection of parked vehicles indicating the presence of a parked vehicle.

If no missing shadows are detected at step 310, then an output is generated indicating that this aisle does not include any parking vacancies and at step 302 the vehicle is instructed to proceed to the next parking aisle and repeat the process. In some embodiments, the determinations at steps 304, 306, and 308 that the parking aisle includes parked vehicles (step 304), that shadows are available for detection (step 306), and are in fact detected (step 308), a determination at step 310 that no missing shadows are detected may also be considered a determination that all parking spots in the aisle are occupied. In particular, the determination at step 310 that all parking spots are occupied prevents the vehicle from having to drive down the parking aisle—and potentially back up the parking aisle if no spot exists. If a missing shadow indicative of a parking vacancy is detected at step 310, then an output is generated indicating the presence of a vacancy and the vehicle proceeds to travel down the parking aisle.

At step 314 one or more sensors are utilized to detect the vacancy identified by the missing shadows. For example, in some embodiments the one or more sensors are the same one or more sensors utilized to detect vehicles at step 304. In some embodiments, the one or more sensors include LiDAR sensors, radar sensors, ultrasonic sensors and/or cameras utilized to detect a parking spot vacancy. In the event no parking spot vacancy is detected (e.g., false positive detected based on the shadows) then an output is generated indicating the false event and the vehicle is instructed to proceed to the next aisle at step 302. In some embodiments, analysis may be performed to determine what caused the false positive event and may be provided in feedback to prevent the same root cause from causing future false positives.

If at step 314 a vacancy is detected based on the one or more sensors, then at step 316 outputs are generated to cause the autonomous or semi-autonomous vehicle to park within the vacancy and the process ends.

Figure 4:
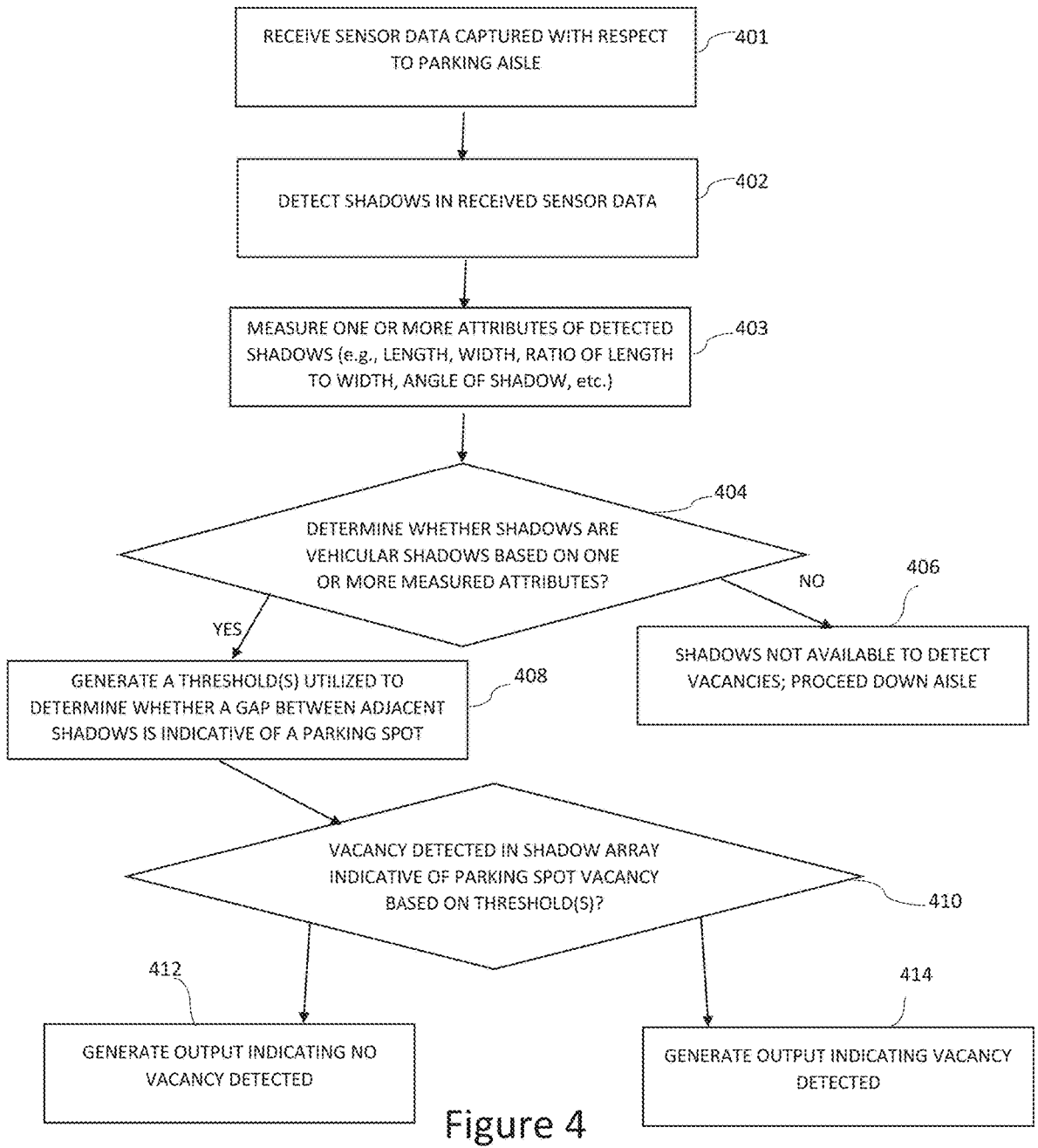
FIG. 4 is a flowchart illustrating a method of utilizing shadows to detect vacant parking spots according to some embodiments.

Referring now to FIG. 4, additional detail regarding analysis performed to detect parking vacancies is provided according to some embodiment. At step 401, sensor data is received with respect to the adjacent parking aisle. As discussed above, this may include image data captured by a camera and/or infrared data captured by an infrared sensor. At step 402 the received sensor data is utilized to detect the presence of shadows. For example, in the embodiment shown in FIG. 5c, computer vision techniques (such as those described above) are utilized to detect shadows (indicated by white portions—with non-shadow pixels indicated in black).

Figure 5C:
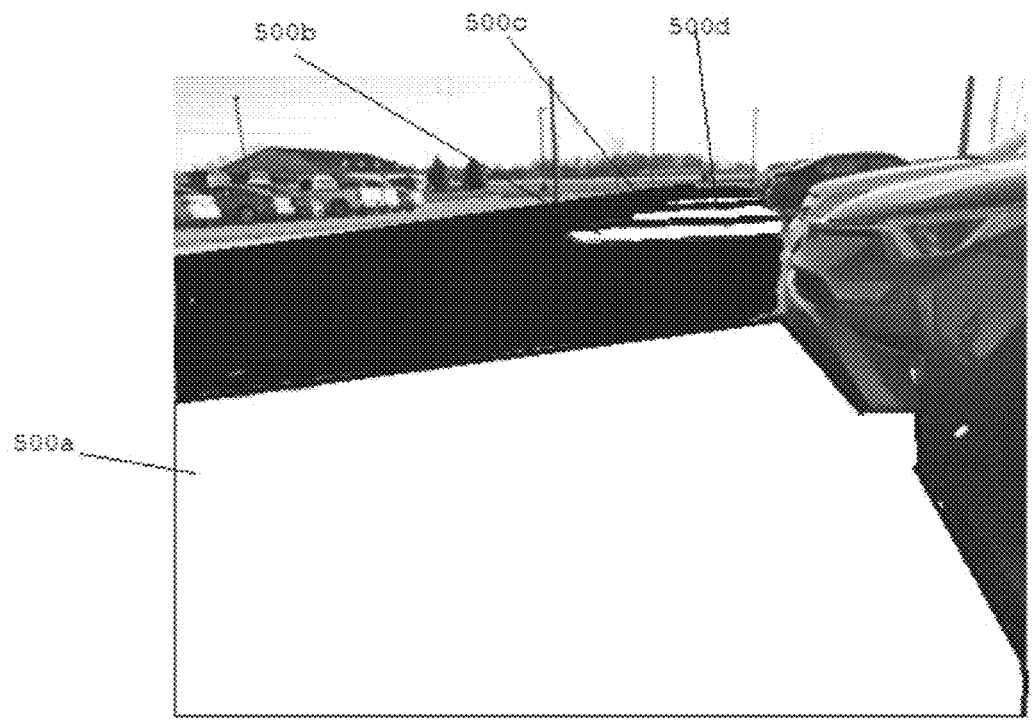
FIG. 5c is a computer vision image of the photograph identifying shadows with white pixels and non-shadows with black pixels according to some embodiments.
Figure 5D:
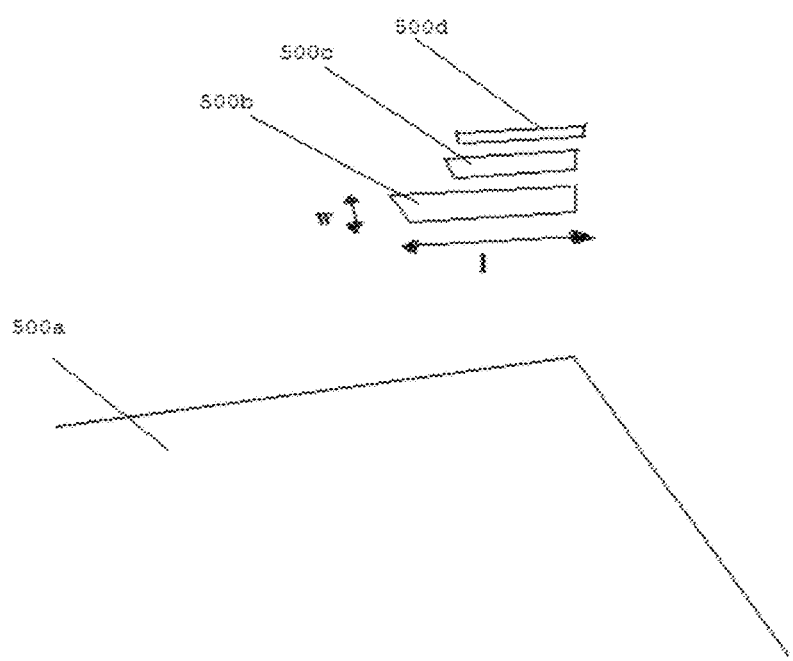
FIG. 5d is a computer vision image of the photograph illustrating shadow measurements according to some embodiments.

At step 403, one or more attributes associated with the detected shadows are measured. In some embodiments, measured attributes may include one or more of shadow length, shadow width, length-to-width ratio, and/or angle of the created shadows. In some embodiments, measured attributes are provided with respect to each shadow attributed to a particular vehicular shadow. For example, in the embodiment shown in FIG. 5c, a plurality of shadows (indicated by the white pixels) have been detected, each shadow separated from an adjacent shadow by a sliver of light (shown in black). Detected shadows include shadow 500a, 500b, 500c, and 500d. Measured attributes are made with respect to each of the detected shadows 500a, 500b, 500c, and 500d. For example, as shown in FIG. 5d, measured attributes include length and width of each of the plurality of detected shadows. In some embodiments, at least some of the attributes may be measured based on counting pixels associated with detected shadows. However, as shown in FIGS. 5c and 5d, the further away the shadow is located from the sensor, the smaller the shadow will appear. In some embodiments, rather than simply count pixels, the distance from the sensor is determined and utilized to convert the counted pixels into actual lengths and widths. That is, rather than express shadow 500a in terms of a number of pixels long by a number of pixels wide, an actual length and width of the shadow 500a is calculated.

At step 404, the measured attributes are utilized to determine whether the detected shadows are indicative of parked vehicles. For example, in some embodiments based on knowledge of the location of the illumination source (e.g., sun, lights), and expected dimensions of vehicles, expected shadow lengths/widths, length-to-width ratios, etc. can be determined. If at step 404 a determination is made that the detected shadows are not cast by one or more vehicles, then at step 406 a determination is made that the shadows cannot be used to detect vacancies. In response, the vehicle may be required to travel down the aisle and detect vacancies using other sensors. If at step 404 a determination is made that the detected shadows are cast by one or more vehicles, this indicates that the shadows can be utilized to detect vacancies, and the method continues at step 408 to use the measured attributes to define thresholds for detecting vacancies.

At step 408 one or more thresholds are generated based on the one or more measured attributes to determine whether a gap between adjacent shadows is indicative of a vacancy. In some embodiments, a plurality of thresholds or dynamic thresholds are defined based on the location of the shadows. Once again, the threshold may be expressed in the form of pixels, distances, ratios or angle thresholds depending on how the detected shadows are expressed. In some embodiments, for shadows or gaps in shadows located close to the vehicle, the number of pixels associated with a vehicle shadow or gap may be larger than the number of pixels associated with a vehicle shadow or gap located further down the aisle. For example, this is illustrated in FIG. 5d, in which the size of the shadows decrease the further down the aisle the shadows are located. In some embodiments, the threshold is utilized to assess the width of the gap between adjacent shadows. For example, in the embodiments shown in FIGS. 5c and 5d, a gap exists between each of the detected shadows 500a, 500b, 500c, and 500d, but the gap between shadows 500a and 500b is significantly wider. The threshold determined at step 408 is utilized to assess which of these gaps is indicative of a parking vacancy. In some embodiments, a threshold is generated with respect to each pair of adjacent shadows. For example, the width of shadows 500a and 500b may be averaged and utilized to determine a threshold that indicates the presence of a vacancy between the vehicles responsible for casting shadows 500a and 500b. That is, in some embodiments the threshold generated with respect to shadows 500a and 500b may differ from the threshold generated with respect to shadows 500c and 500d.

At step 410, the threshold(s) generated at step 408 are compared to gaps between adjacent shadows to detect vacant parking spots. In some embodiments, parking vacancies are detected in response to the gap between adjacent shadows being greater than the defined threshold. For example, in the embodiment shown in FIG. 5d, the gap between shadows 500a and 500b is greater than a threshold, resulting in a determination that a parking spot vacancy exists at this location. If no vacancies are detected at step 410 than at step 412 an output is generated indicating that no vacant parking spots have been detected, and that the vehicle should proceed to the next aisle rather than traveling down the current aisle. If vacancies are detected at step 410, then at step 414 an output is generated indicating that a vacancy has been detected and instructing the vehicle to proceed down the current aisle to the detected vacancy.

In this way, the present disclosure provides a system and method of detecting vacant parking spots based on detected shadows (i.e., detecting that each parking spot is occupied). A benefit of the system and method described herein is that the vehicle is able to detect in some cases if each parking spot in an aisle is occupied and therefore prevents the vehicle from having to traverse these aisles.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

According to one aspect, a method of identifying vacant parking locations may include receiving sensor data captured with respect to a parking aisle and analyzing the received sensor data to detect shadows cast by parked vehicles within the parking aisle. Vacancies may be detected based on the detected shadows and an output generated indicating whether a parking spot vacancy has been detected.

The method of the preceding paragraph can optionally include, additionally and/or alternatively any, one or more of the following features, configurations and/or additional components.

According to some embodiments, the sensor data is image data captured by a camera.

According to some embodiments, the sensor data is thermal data captured by an infrared camera.

According to some embodiments, the method may further include measuring one or more attributes of detected shadows.

According to some embodiments, measuring one or more attributes of detected shadows includes measuring one or more of shadow length, shadow width, length-to-width ratio, and angle-of-shadow.

According to some embodiments, the method may further include generating a threshold(s) utilized to determine whether a gap between adjacent shadows in indicative of a parking spot vacancy based on the one or more measured attributes.

According to some embodiments, detecting a vacant parking spot based on the detected shadows may further include comparing a gap between adjacent shadows to the generated threshold(s).

According to another aspect, a method of self-parking a vehicle within a parking lot may include positioning the vehicle at a first end of a first aisle and detecting shadows in the aisle using input received from one or more first sensors. The method may further include detecting parked vehicles based on the detected shadows, wherein if all parking spots are occupied the vehicle is instructed to proceed directly to the next aisle.

The method of the preceding paragraph can optionally include, additionally and/or alternatively any, one or more of the following features, configurations and/or additional components.

According to some embodiments, the method may further include detecting a presence of parked vehicles using input received from one or more second sensors, wherein if no parked vehicles are detected the vehicle is instructed to proceed down the first aisle.

According to some embodiments, the method may further include determining based on one or more inputs whether shadows are available for detection, wherein the one or more inputs includes one or more of time of day, and weather, position/angle of the sun.

According to some embodiments, if shadows are not available for detection the vehicle is instructed to proceed down the first aisle.

According to some embodiments, the method may further include measuring one or more attributes of detected shadows, wherein the one or more measured attributes include one or more of shadow length, shadow width, length-to-width ratio, and angle-of-shadow.

According to some embodiments, the method may further include generating a threshold(s) utilized to determine whether a gap between adjacent shadows is indicative of a parking spot vacancy based on the one or more measured attributes.

According to some embodiments, detecting a vacant parking spot based on the detected shadows may include comparing a gap between adjacent shadows to the generated threshold(s).

According to another aspect, a parking vacancy detection system for use in vehicles may include a first plurality of sensors configured to detect image data associated with a parking aisle located adjacent to the vehicle and a processor/controller configured to receive the image data detected by the first plurality of sensors. In some embodiments, the processor/controller is configured to detect shadows based on the received image data and to detect vacant parking spots based on detected gaps within the detected shadows, wherein the processor/controller generates an output identifying whether the parking aisle includes vacant parking spots.

The system of the preceding paragraph can optionally include, additionally and/or alternatively any, one or more of the following features, configurations and/or additional components.

For example, in some embodiments the system may further include a second plurality of sensors, wherein the second plurality of sensors are configured to detect the presence of parked vehicles and wherein the processor/controller utilizes the detected presence of parked vehicles to determine whether shadows can be utilized to detect vacant parking spots.

According to some embodiments the processor/controller is configured to receive input from one or more external sources regarding the presence of and orientation of a light source, wherein the processor/controller utilizes the received input to determine whether shadows can be utilized to detect vacant parking spots.

According to some embodiments, the processor/controller is configured to receive orientation data from one or more orientation sensors, wherein the processor/controller utilizes the received orientation data in combination with input from one or more external sources regarding the presence of and orientation of a light source to determine a likely location of shadows cast in response to parked vehicles.

According to some embodiments, the processor/controller may measure one or more attributes of detected shadows.

According to some embodiments, the processor/controller may measure one or more of shadow length, shadow width, length-to-width ratio, and angle-of-shadow and generates a threshold utilized to determine whether a gap between adjacent shadows in indicative of a parking spot vacancy based on the one or more measured attributes.

The inventio claimed is:

1. A method of self-parking a vehicle within a parking lot, the method comprising:
    positioning the vehicle at a first end of a first aisle;
    receiving sensor input from shadow detection sensors positioned on the vehicle with respect to the first aisle, wherein the sensor input is utilized to detect shadows cast by cars parked in the first aisle; and
    identifying a parking vacancy in the first aisle based on a detected gap between the detected shadows;
    wherein if no parking vacancy is detected, the vehicle is instructed to proceed to a next aisle without traveling down the first aisle.

2. The method of claim 1, wherein if a vacant parking spot is detected, the vehicle is instructed to travel down the first aisle to the vacant parking spot.

3. The method of claim 1, further including:
    receiving additional sensor input from vehicle detection sensors positioned on the vehicle with respect to the first aisle, wherein the additional sensor input is utilized to detect a presence of parked vehicles within the first aisle, wherein if no parked vehicles are detected within the first aisle, the vehicle is instructed to proceed down the first aisle.

4. The method of claim 1, further including:
receiving additional inputs utilized to determine whether shadows are available for detection, wherein the additional inputs include one or more of time of day, weather, and position or angle of a sun.

5. The method of claim 4, wherein if shadows are not available for detection, the vehicle is instructed to proceed down the first aisle.

6. The method of claim 1, further including:
measuring one or more attributes of detected shadows, wherein the one or more measured attributes include one or more of a shadow length, a shadow width, a length-to-width ratio, and an angle-of-shadow.

7. The method of claim 6, further including generating one or more thresholds based on the one or more measured attributes of the detected shadows, wherein the one or more thresholds are utilized to determine whether the detected gap between adjacent shadows is indicative of a parking spot vacancy.

8. The method of claim 7, wherein detecting a vacant parking spot based on the detected shadows includes comparing the detected gap between adjacent shadows to the generated one or more thresholds.

9. A process of identifying vacant parking locations, the process comprising:
  a. receiving sensor data from one or more sensors;
  b. detecting shadows in received sensor data;
  c. determining whether detected shadows in the received sensor data are vehicular shadows based on one or more measured attributes of the detected shadows; and
  d. detecting a vacant parking spot based on the one or more attributes of the vehicular shadows.

10. The process of claim 9, wherein the one or more attributes of the detected shadows include one or more of a shadow length, a shadow width, a length-to-width ratio, and an angle-of-shadow.

11. The process of claim 9, further including:
  e. generating one or more thresholds based on the one or more measured attributes of the detected shadows, wherein the one or more thresholds are utilized to determine whether a gap between adjacent shadows is indicative of a parking spot vacancy.

12. The process of claim 11, wherein detecting a vacant parking spot includes comparing a gap between adjacent shadows to the generated one or more thresholds.

13. The process of claim 9, wherein the received sensor data comprises image data captured by a camera.

14. The process of claim 9, wherein the received sensor data comprises thermal data captured by an infrared camera.

15. A method of identifying vacant parking locations, the method comprising:
receiving first sensor data with one or more first sensors, the one or more first sensors configured to detect image data;
receiving second sensor data with one or more second sensors, the one or more second sensors configured to detect a presence of parked vehicles; and
analyzing the received first sensor data to detect a vacant parking spot based on detected shadows, wherein analyzing the received first sensor data includes:
detecting shadows in the received first sensor data,
determining whether detected shadows in the received sensor data are vehicular shadows based on one or more measured attributes of the detected shadows, and
detecting the vacant parking spot based on the one or more attributes of the vehicular shadows.

16. The method of claim 15, wherein the one or more measured attributes of the detected shadows includes one or more of a shadow length, a shadow width, a length-to-width ratio, and an angle-of-shadow.

17. The method of claim 16, further including generating one or more thresholds utilized to determine whether a gap between adjacent shadows is indicative of a parking spot vacancy based on the one or more measured attributes.

18. The method of claim 17, wherein detecting the vacant parking spot based on the detected shadows includes comparing the gap between adjacent shadows to the generated one or more thresholds.

19. The method of claim 15, wherein if shadows are not available for detection, the vacant parking spot is detected by the one or more second sensors.

20. The method of claim 15, wherein the one or more second sensors are configured to generate a LiDAR signal and is configured to receive a reflected LiDAR signal.

* * * * *